United States Patent [19]

Imazeki

[11] Patent Number: 4,626,857

[45] Date of Patent: Dec. 2, 1986

[54] DUAL FREQUENCY BAND RADAR DETECTOR

[75] Inventor: Kazuyoshi Imazeki, Tokyo, Japan

[73] Assignee: General Research of Electronics, Inc., Tokyo, Japan

[21] Appl. No.: 504,587

[22] Filed: Jun. 15, 1983

[51] Int. Cl.$^4$ .................... H04B 17/00; H04B 1/26; G01S 7/40

[52] U.S. Cl. .................... 342/20; 455/166; 455/226; 455/228; 342/103

[58] Field of Search .................... 343/7 A, 7 PL, 18 E; 455/226–229, 260–265, 166; 375/92

[56] References Cited

U.S. PATENT DOCUMENTS

| | | | |
|---|---|---|---|
| 4,190,838 | 2/1980 | Kemp | 343/18 E |
| 4,313,216 | 1/1982 | Jaeger et al. | 455/226 |
| 4,315,261 | 2/1982 | Mosher | 343/18 E |

OTHER PUBLICATIONS

D. Mennie, "Helping Speeders Beat the Radar Rap", IEEE Spectrum, Aug. 1978, pp. 38–42, vol. 15, #8.

Primary Examiner—T. H. Tubbesing
Assistant Examiner—Gilberto Barrón, Jr.
Attorney, Agent, or Firm—Trexler, Bushnell & Wolters, Ltd.

[57] ABSTRACT

A dual frequency band radar detector responds to radar signals occurring within either of a first or a second range of frequencies. The detector comprises one or more antennas for receiving radar signals including radar signals occurring within the first and second ranges of frequencies. At least one pilot signal at a predetermined frequency is produced for modulating the received radar signals. The modulated signals produced in response to received signals in either of said first range of frequencies or said second range of frequencies are isolated. A detector is coupled in circuit for detecting the one pilot signal in these isolated and modulated signals and a control output signal is produced responsive to the detected pilot signal. Accordingly, the presence of a control output signal indicates the reception of radar signals occurring within at least one of the first and second ranges of frequencies.

18 Claims, 5 Drawing Figures

Fig. 4(a)

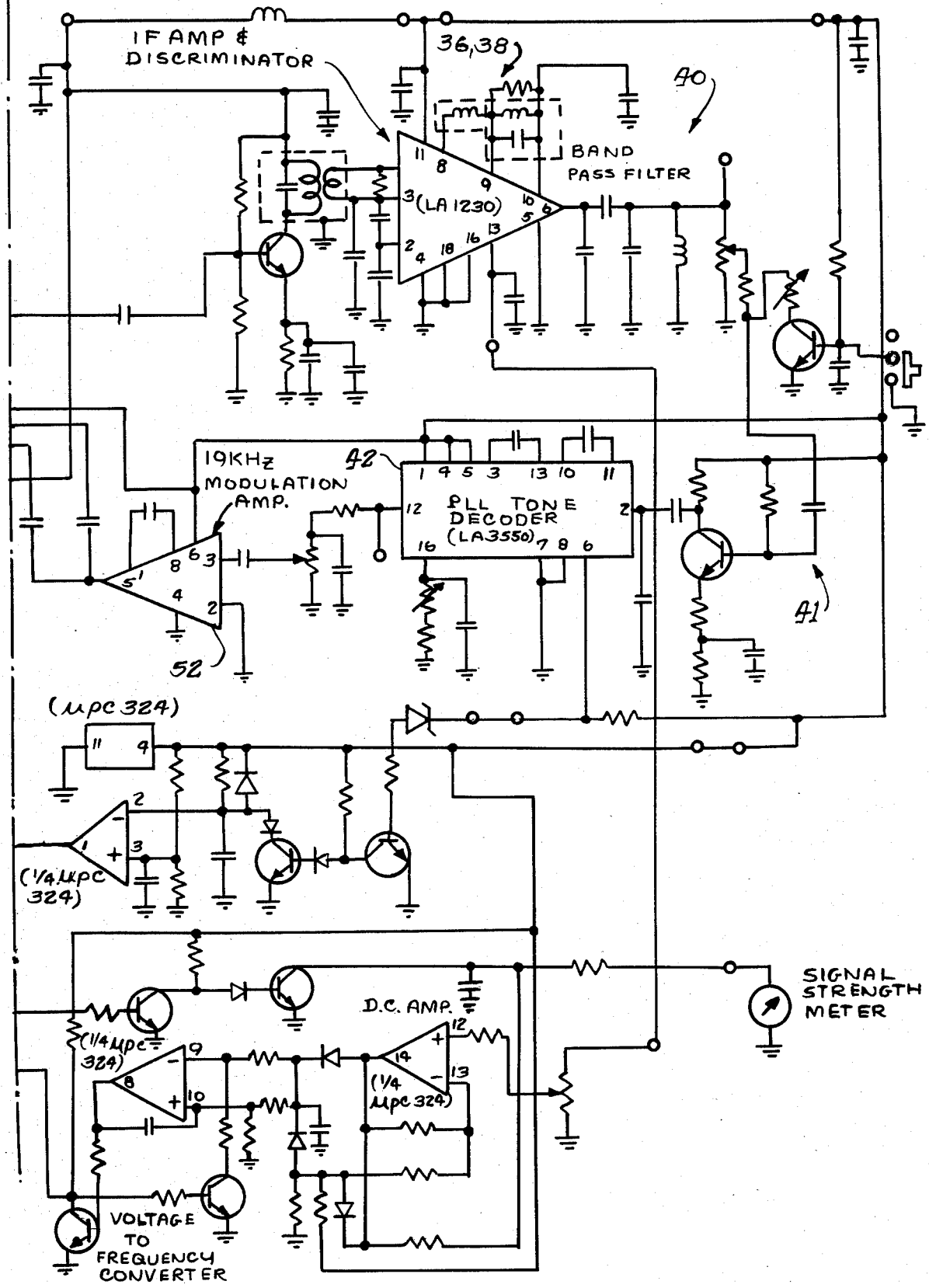

4,626,857

DUAL FREQUENCY BAND RADAR DETECTOR

BACKGROUND OF THE INVENTION

This invention relates generally to radar receiving apparatus and more particularly to a radar detector which is capable of simultaneously receiving and indicating detection of radar signals occurring within either of at least two frequency bands.

While the invention may find other utility, the description herein will be facilitated by reference to the detection of radar signals in the X- and K- bands. The United States Federal Communications Commission (FCC) has established that X-band radar signals be transmitted at 10.525 GHZ with a tolerance of ±0.025 GHZ, and that K-band radar signals be transmitted at 24.150 GHZ with a tolerance of ±0.100 GHZ. Many prior art receivers for these signals employ crystal detectors; however, these detectors frequently are not sufficiently sensitive to reliably detect radar signals over a long distance, and are subject to other deficiencies as well.

The prior art has also proposed the use of superheterodyne type receivers for the detection of such radar signals. However, the relatively broad FCC tolerances mentioned above have heretofore required, a relatively broad bandwidth for such reception.

Consequently, such receivers have exhibited frequency inaccuracies and drift, as well as limitations in sensitivity, signal-to-noise ration, and spurious signal rejection.

OBJECTS AND SUMMARY OF THE INVENTION

It is therefore a general object of the invention to provide a novel and improved radar detector which substantially avoids the problems of the prior art.

A more specific object is to provide such a radar detector which is capable of detecting the presence of radar signals within either the X-band or K-band.

A related object is to provide a radar detector in accordance with the foregoing objects which is relatively simple and inexpensive in its design and construction and yet highly reliable in operation.

Briefly, in accordance with the foregoing objects, apparatus for detecting the presence of radar signals occurring within either of a first or a second range of frequencies comprises antenna means for receiving radar signals including radar signals occurring within said first and second ranges of frequencies. Means are provided for producing at least one pilot signal at a predetermined frequency and for modulating the received radar signals with said at least one pilot signal. Means are also provided for isolating ones of the modulated signals produced in response to received signals in said first range of frequencies or in said second range of frequencies. Detecting means are coupled with said isolating means for detecting said at least one pilot signal and control means are responsive to said detected pilot signal for producing a control output signal. Accordingly, the presence of a control output signal indicates the reception of radar signals occurring within at least one of said first and second ranges of frequencies.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIGS. 4(a) and 4(b) together comprise a schematic circuit diagram of an alternative embodiment of the invention illustrated in the block diagram of FIG. 1, illustrating a preferred embodiment of the invention in greater detail.

DETAILED DESCRIPTION OF THE ILLUSTRATED EMBODIMENT

Figure 1:
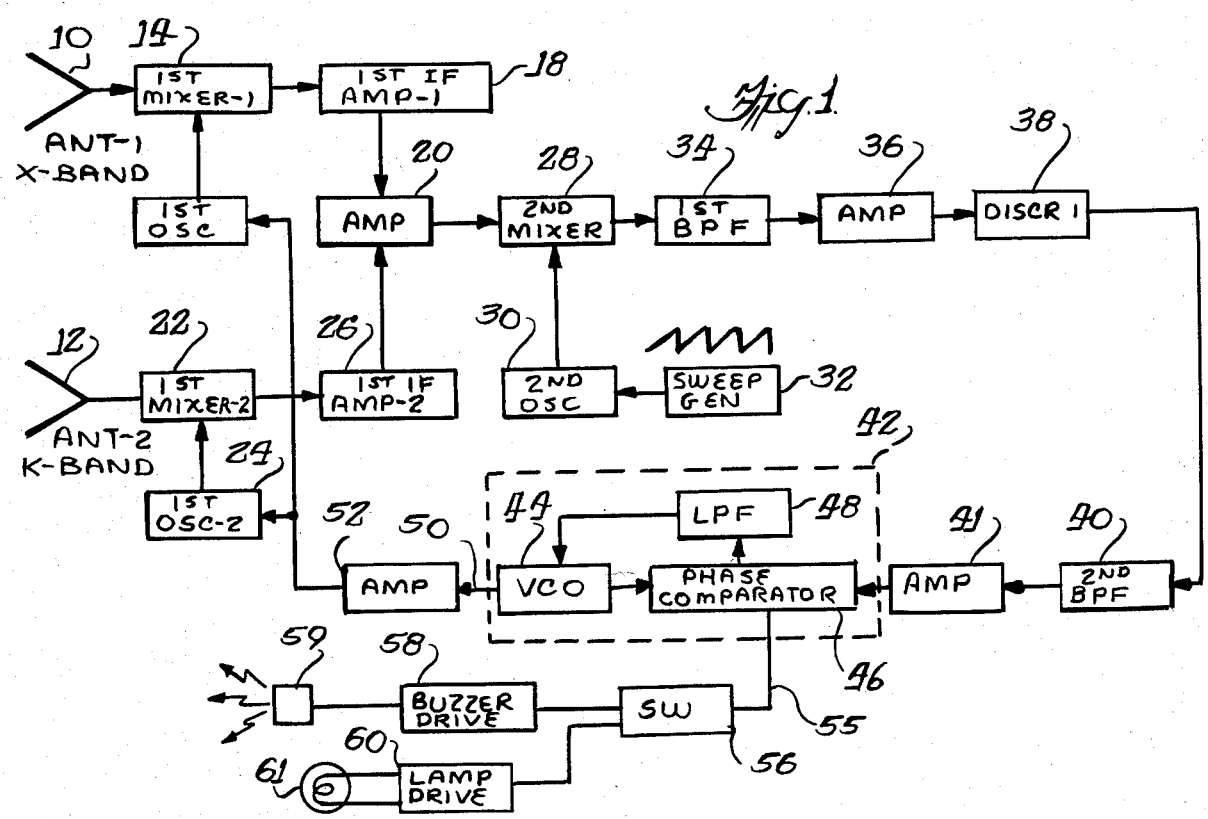
FIG. 1 is a block diagram of a radar detector circuit in accordance with one embodiment of the invention.

Referring now to the drawings, and initially to FIG. 1, a first embodiment of a radar detector circuit in accordance with the invention is illustrated in block diagram form. In the illustrated circuit, X-band and K-band CW or pulsed electro-magnetic radiation signals are received by a first antenna 10 and a second antenna 12. In accordance with present FCC regulations, the X-band covers frequencies of 10.500–10.550 GHz, and the K-band covers frequencies of 24.050–24.250 GHz.

The first or X-band antenna 10 is coupled to a first mixing circuit 14 in which a signal from the antenna 10 is heterodyned with a local oscillator signal from a first local oscillator 16. This oscillator signal from the oscillator 16 is preferably a 9.492 GHz signal frequency-modulated with a pilot signal of 19 KHz, as will be explained hereinafter in detail. The output from the first mixer 14 is connected to a first tuned IF amplifier 18 which is preferably tuned to amplify the signals produced by the mixer in response to reception of X-band signals. Hence, the IF amplifier 18 is tuned to amplify signals in the range of 1.033±0.025 GHz. The amplified signal from the first IF amplifier 18 is applied to an input of a common amplifier 20.

A second similar circuit comprising a first mixer 22 is coupled to the K-band antenna 12. A first local oscillator 24 and a first IF amplifier 26 are also provided, the latter having its output connected to a second input of the common amplifier 20. This circuit is substantially identical to the previous circuit except, however, local oscillator 24 preferably oscillates at 23.117 GHz, but frequency-modulated with the above-mentioned 19 KHz pilot signal. Hence, the heterodyned output from first mixer 22 is in the frequency range of 1.033±0.100 GHz. Consequently, the second IF amplifier 26 is tuned to this same frequency range or bandwidth.

The output of the common amplifier 20 is coupled to a second mixer 28. Therefore, the second mixer is adapted to receive the 1.033±0.025 GHz first IF signal relating to the X-band microwaves and the 1.033±0.100 GHz first IF signal relating to the K-band microwaves. Also received by the second mixer 28 is a swept signal from a second local oscillator 30. The frequency of this second local oscillator signal sweeps continuously, preferably between 0.983 and 1.083 GHz. The speed of sweeping this frequency range is determined by a sawtooth waveform, preferably of a 30 Hz repetition rate, from a sweep generator 32. In place of the sawtooth wave, a triangular waveform may also be used for sweeping the frequency of the second local oscillator signal.

The second mixer 28 heterodynes the 1.033 GHz (center frequency) intermediate first IF signals with this variable or sweep frequency local oscillator signal swept by the 30 Hz sweeping signal.

A first band-pass filter 34 coupled to the second mixer 28 is tuned to pass therethrough the second mixer output when it is within a frequency band about a center frequency of preferably 10.7 MHz. The width of this frequency band is determined by other considerations which will be described later.

The output of the first band-pass filter is amplified by a 10.7 MHz tuned amplifier and applied to a discriminator 38. The discriminator 38 is adapted to demodulate the intermittent 10.7 MHz band-passed and amplified signal to detect therefrom the 19 KHz pilot signal, which will occur intermittently when the system is receiving either the X- or the K-band wave. The periodicity of the 19 KHz pilot signal at the discriminator 38 depends in part upon the frequency of the sweeping sawtooth (or triangular) waveform generated by the sweep generator 32.

The demodulated intermittent pilot signal is passed through a 19 KHz narrow band-pass filter 40 which, in a preferred embodiment, has a pass band of 19 KHz±100 Hz. The output of this second band-pass filter is amplified by an amplifier 41 and applied to a phase-locked loop (PLL) designated generally by reference numeral 42.

The PLL is shown to comprise a voltage controlled oscillator 44, a phase comparator 46 and a low-pass filter 48. The voltage controlled oscillator 44 provides on a line 50 a 19 KHz continuous pilot signal which is then amplified by an amplifier 52 and thereafter applied to the X-band and K-band first local oscillators 16 and 24 for the frequency modulation described previously.

In operation, when either X-band or K-band signals are received by the illustrated system, the intermittent 19 KHz demodulated pilot signal in the form of a 19 KHz tone burst train occurs on a PLL input line 54. This intermittent demodulated pilot signal is compared in the phase comparator 46 with a second output signal from the VCO 44, which is the same as the continuous pilot signal produced at the first VCO output 50.

The low-pass filter 48 in the PLL block 42 mainly functions to bring the PLL 42 into the locked condition even though there may be some small phase difference between the continuous pilot signal and the intermittent frequency demodulated pilot signal, as well as a small number of burst pulses included in each demodulated pilot burst.

Accordingly, the phase comparator 46 produces an output signal on a line 55 when the frequencies and phases of the respective pilot signal produced by VCO 44 and demodulated intermittent pilot signal are substantially the same in phase and frequency. This output signal on line 55 is utilized, in the illustrated embodiment to drive a switch 56, which preferably comprises an electronic switching component. This switch 56 is in turn utilized to actuate or energize suitable observable indicators for indicating the reception of radar signals in either the X-band or the K-band. In the illustrated embodiment, these indicators take the form of a buzzer 59 and a lamp 61. Accordingly, a suitable buzzer drive 58 and a suitable lamp drive 60 are arranged to be energized or activated by the switch 56 to in turn actuate the respective buzzer 59 and lamp 61.

The foregoing circuit, in accordance with one aspect of the invention, thus functions as a pilot signal servo-loop. In a preferred embodiment, the pass band of the 10.7 MHz band-pass filter 34 is selected to optimize the operation of this servo-loop. That is, as the band-pass of the band-pass filter 34 is decreased, the sensitivity of the servo-loop is increased. Correspondingly, a narrow pass band of the first band-pass filter 34 results in a large pilot signal servo-loop gain, providing several pulses in each burst to achieve stable locking in of the phase lock loop 42.

In accordance with another aspect of the invention, the use of a narrow pass band for the 19 KHz band-pass filter 40 results in a high signal-to-noise ratio. Hence, the width of the reception frequency band in the illustrated system can be kept narrow to provide high sensitivity. Moreover, since only the signals passing through the first mixers 14 and 22 are frequency modulated with the pilot signal, the above-described system exhibits a relatively high rejection of spurious signals or noise in the circuits following these first mixers.

In operation, the signals to be detected in the X-band and K-band are effectively selected from all of the signals received at the respective antennas 10 and 12 by the action of the first mixers 14, 22 and associated oscillators 16, 24 which mix the received signals with the pilot-signal-modulated local oscillator signals to obtain corresponding converted or intermediate-frequency ("IF") signals, but having been modulated by the pilot signal, in accordance with one feature of the invention.

The pilot signal is then detected by the discriminator 38 and delivered to the comparator 46 which provides a suitable control signal output on line 55 when the demodulated pilot signal is substantially the same in phase and frequency with the pilot signal produced and sent to the first local oscillators 16 and 24. Advantageously, the provision of a phase lock loop including the phase comparator 46 and a VCO 44 for generating this pilot signal completes a pilot signal servo-loop and substantially locks in the produced pilot signal with the detected pilot signal.

In accordance with another feature of the invention, additional improvement in sensitivity as well as spurious and noise rejection is obtained by the second mixer 28 which further mixes the first IF signal with a sweep signal, and the following band-pass filter 34 which is adjusted to have a relatively narrow pass band. Accordingly, these additional components further process the signal fed to the discriminator 38 for demodulation of the pilot signal.

Figure 2:
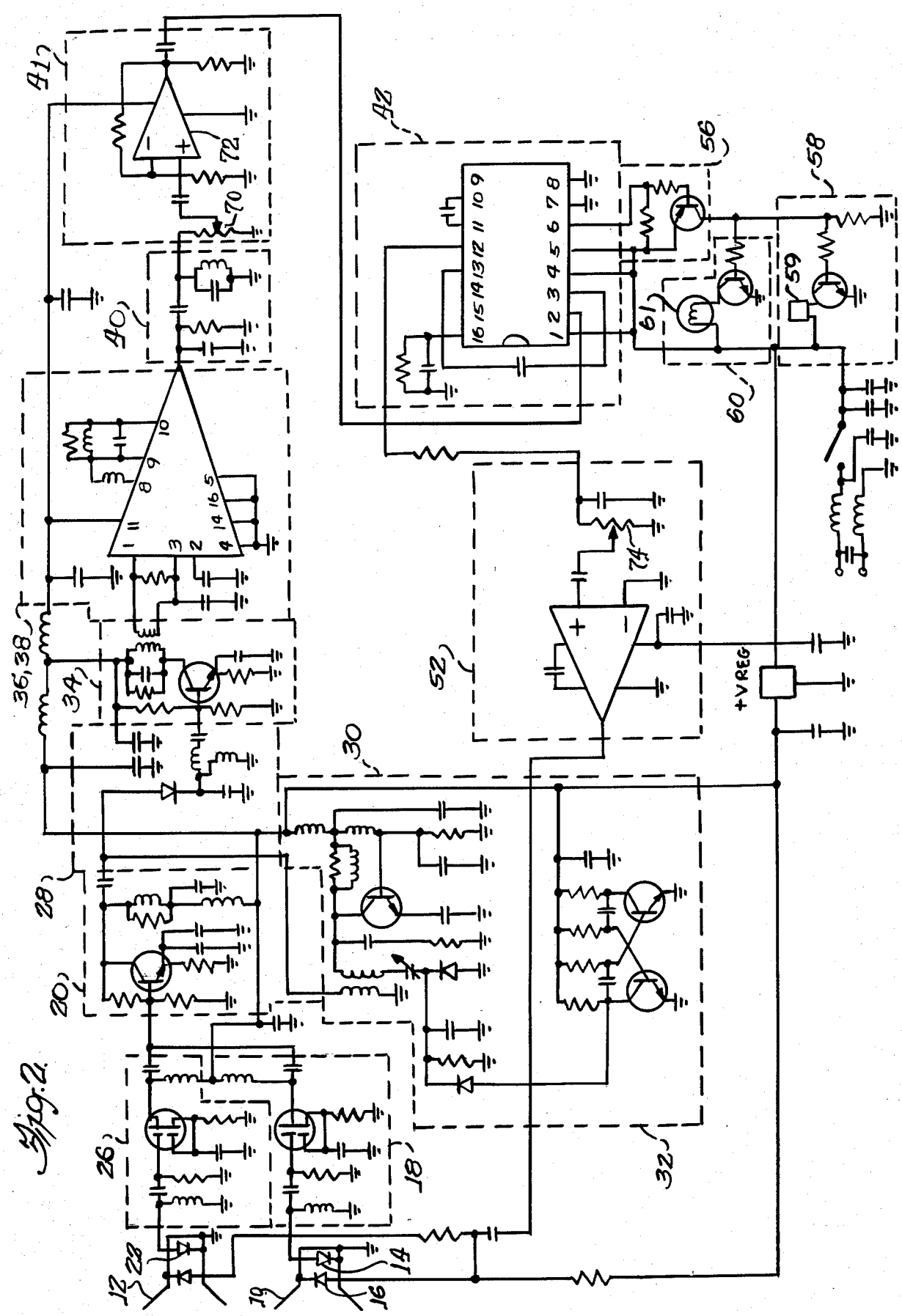
FIG. 2 is a schematic circuit diagram illustrating details of the circuits of FIG. 1.

Referring briefly to FIG. 2, the circuit components schematically illustrated therein comprise preferred components making up the system of FIG. 1. The reference numerals of FIG. 1 have been utilized in FIG. 2 to indicate the components comprising the respective blocks of FIG. 1.

Antennas 10 and 12 preferably comprise horn-type antennas and incorporate the mixers 14, 22 and the oscillators 16, 24 in the form of Gunn diodes. Preferably, the oscillator Gunn diode 16 is biased to eight volts and the oscillator Gunn diode 24 is biased to five volts. The use of separate Gunn diode oscillators for the respective antennas advantageously permits the first stage mixers and oscillators to be located very close to the antenna itself as well as to the first IF amplifiers 18 and 26. This substantially avoids the introduction of noise and/or spurious signals which might be introduced if relatively long cable connectors were utilized intermediate these components.

The amplifier 20 comprises a single-stage transistorized amplifier circuit which feeds the second mixer 28 as described previously. The second oscillator 30 comprises a conventional transistorized oscillator circuit driven through the sweep range by a push-pull configuration transistorized sweep generator or oscillator 32.

The first band-pass filter 34 comprises an active filter which is inductively coupled to the appropriate inputs of the amplifier 36, which together with discriminator 38 is preferably realized as a single integrated circuit component, such as RCA type 3089 or Sanyo type LA1230. The second band-pass filter 40 is a passive filter which by way of a suitable potentiometer 70 feeds a non-inverting input of an operational amplifier 72 comprising the amplifier block 41, and is utilized for further adjusting the sensitivity of the system. The phase-locked loop circuit 42 preferably comprises an integrated circuit component such as a Sanyo type LA3350. Other similar integrated circuits, such as a type 567 may also be used. Amplifier 52 also comprises an operational amplifier and is provided with an input potentiometer 74 for adjusting the amount or degree of modulation provided thereby to the first local oscillators 16 and 24.

Figure 3:
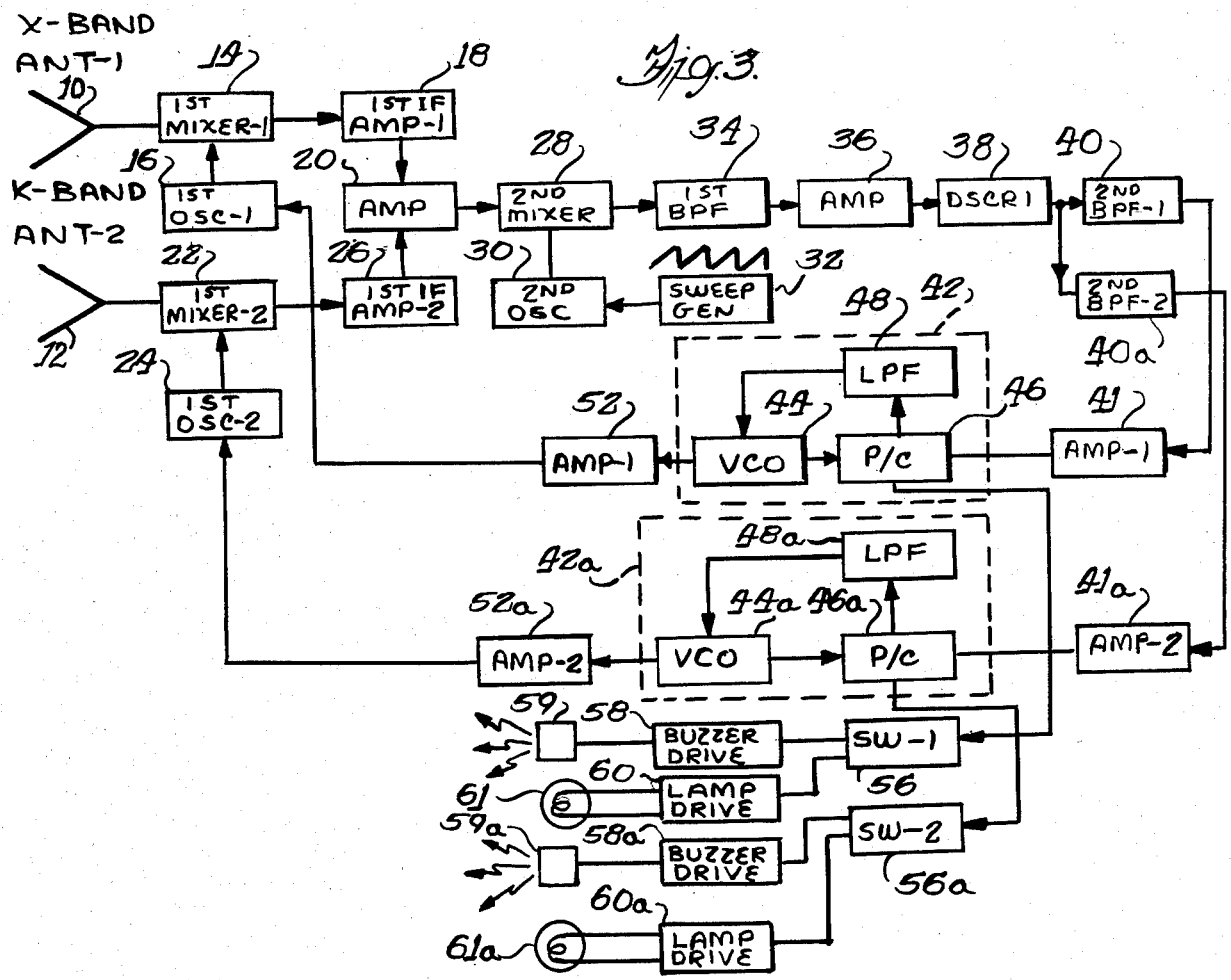
FIG. 3 is a block diagram of a radar detector circuit in accordance with a second embodiment of the invention.

Reference is next invited to FIG. 3 which shows how the addition of relatively few components to the circuit of FIG. 1 makes possible the production of signals for separately indicating reception of either the X-band or K-band radar signals. In FIG. 3, circuits identical to those illustrated and described above in FIG. 1 are indicated by the same reference numerals. Briefly, the circuit of FIG. 3 makes possible separate identification of the X-band and the K-band radar signals by providing two pilot signals in the same fashion as the single 19 KHz pilot signal was provided in the embodiment of FIG. 1. In the embodiment of FIG. 3, these pilot signals are selected as 17 KHz and 23 KHz, respectively. Accordingly, separate pilot signal generators in the form of VCO's 44 and 44a are utilized to generate these pilot signals and feed them respectively to the first local oscillators 16 and 24 by way of respective amplifiers 52 and 52a.

Thereafter, the signals developed in the first mixers 14 and 22 in the same fashion described above are fed through the same first IF amplifiers 18 and 26, amplifier 20 and mixed in second mixer 28 with the sweep signal from second local oscillator 30. The resultant signals from second mixer 28 are fed through the same first band-pass filter 34 and amplifier 36 to a substantially identical discriminator 38. It will be recognized that discriminator 38 is adapted for demodulating the respective 17 KHz and 23 KHz pilot signals utilized in the embodiment of FIG. 3.

In order to separately utilize the detected or demodulated pilot signals at 17 KHz and 23 KHz, respectively, two band-pass filters 40 and 40a are coupled to the output of the discriminator 38. Hence, the first band-pass filter 40 is tuned to a narrow band about the first or 17 KHz pilot frequency, while the second band-pass filter 40a is tuned to a narrow band about the second or 32 KHz pilot frequency.

Cooperatively, separate amplifiers 41 and 41a receive the respective outputs of band-pass filters 40 and 40a and couple these outputs to respective phase comparators 46, 46a. These phase comparators are coupled with respective VCO's 44 and 44a and with low-pass filters 48 and 48a to form respective phase-locked loops 42 and 42a. Hence, the respective pilot signals are separately generated and locked in the embodiment of FIG. 5.

In similar fashion to the embodiment of FIG. 1, the phase comparator 44 feeds control switch 56 while the phase comparator 46a feeds a similar, but separate control switch 56a. In the same fashion described above with respect to FIG. 1, suitable observable indicators such as a buzzer 59 and lamp 61, with suitable drivers 58 and 60 are activated by the switch 56. In the same fashion, a second set of indicators such as a buzzer 59a and lamp 61a are activated by the second switch 56a by way of suitable driver components 58a and 60a. From the foregoing, it will be seen that the circuit of FIG. 3 permits separate indications to be given for reception of the X-band and K-band radar signals by the simple expedient of duplicating a few of the circuit components of FIG. 1 so as to provide two separately identifiable pilot frequencies. In all other respects, the operation of the circuit of FIG. 3 is identical to that described above with reference to FIG. 1. From the foregoing, it will be appreciated that if both the X-band and K-band signals are received at the same time, the respective indicators for the X-band and K-band will then be energized at substantially the same time.

Figure 4A:
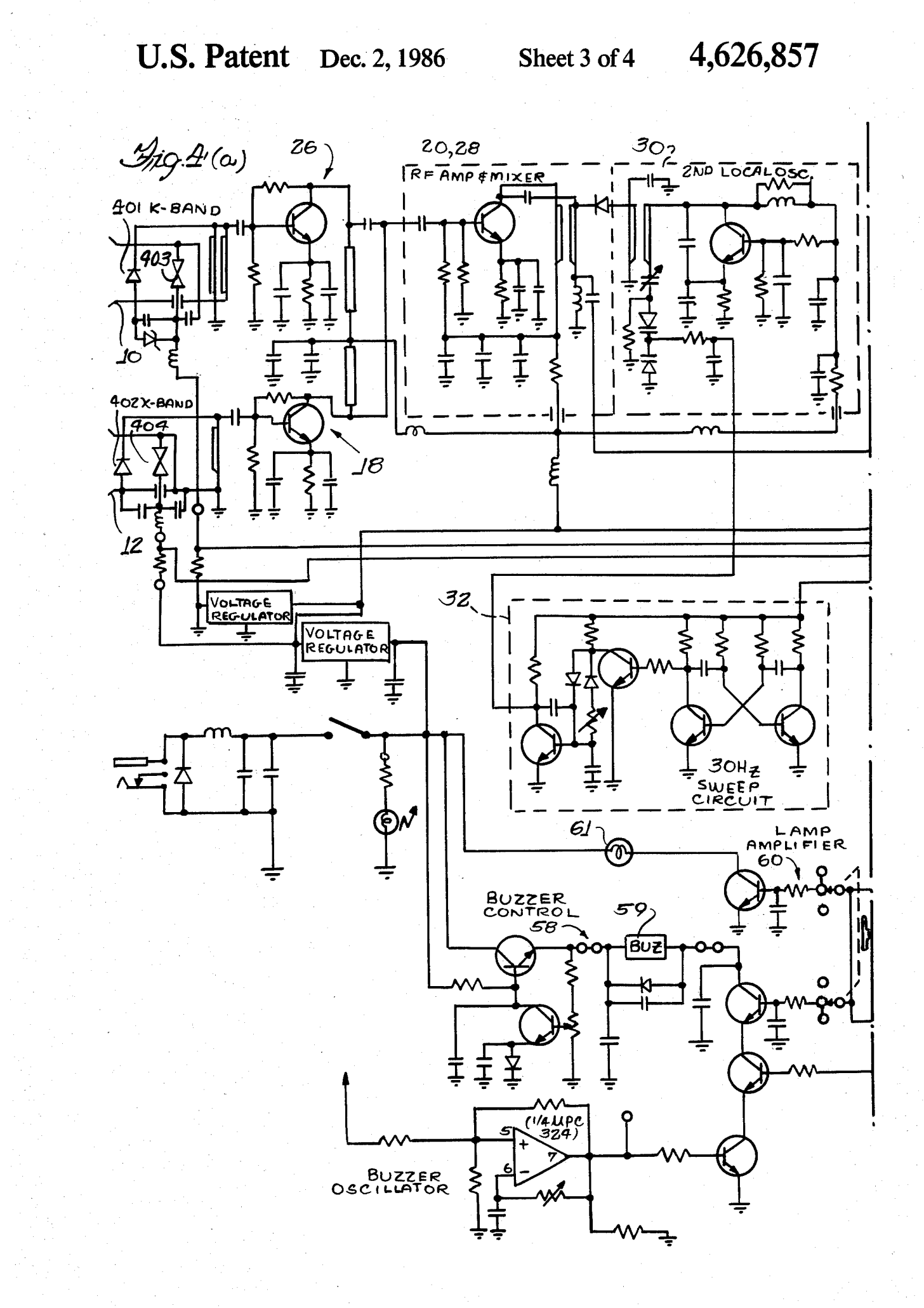

FIGS. 4(a) and 4(b) together comprise a schematic circuit diagram of an alternative embodiment of the invention illustrated in block diagram form in FIG. 1. The circuit of FIGS. 4(a) and 4(b) includes some modifications of that of FIG. 2 and additional circuitry which has been found to improve performance in some applications of the invention. For example K-band mixer diode 401 and K-band Gunn diode 403, as well as their X-band counterparts 402, 404, respectively have been substituted (and the associated circuitry modified) for the corresponding circuitry of FIG. 2.

While particular embodiments of the invention have been shown and described in detail, it will be obvious to those skilled in the art that changes and modifcations of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the spirit and scope of the invention.

The invention is claimed as follows:

1. Apparatus for detecting the presence of radar signals occurring within either of a first or a second range of frequencies comprising: antenna means for receiving radar signals including radar signals occurring within said first and second range of frequencies; signal generating means for producing at least one pilot signal at a predetermined non-varying audio frequency; means for frequency modulating said received radar signals with said at least one pilot signal; means for isolating ones of the modulated signals produced in response to received signals in said first range of frequencies or in said second range of frequencies; frequency demodulating means coupled with said isolating means for detecting said at least one pilot signal; and control means responsive to said detected pilot signal for producing a control output signal; whereby the presence of said control output signal indicates the reception of said radar signals occurring within at least one of said first and second range of frequencies; wherein said control means comprises: band-pass filter means coupled to said demodulating for passing signals in a predetermined frequency band including the predetermined frequency of said at least one pilot signal; and phase comparator means coupled to said band-pass filter means and to said pilot signal producing means for producing said control output signal when the detected pilot signal is substantially the same frequency as and substantially in phase with at least one produced pilot signal.

2. Apparatus in accordance with claim 1 wherein said isolating means comprises tuned amplifier means coupled to said modulating means and tuned to a predetermined range of frequencies; and wherein said frequency demodulating means comprises FM discriminator means coupled in circuit with said tuned amplifier means for demodulating the amplified signals to detect therefrom said at least one pilot signal.

3. Apparatus in accordance with claim 1 wherein said modulating means comprises first local oscillator means for producing a first frequency oscillator signal and a second local oscillator means for producing a second frequency oscillator signal; said signal generating means being coupled with said first and second local oscillator means for modulating said first and second frequency oscillator signals with said at least one pilot signal; and first mixer means coupled to said antenna and to said first local oscillator means for mixing the received signals in said first range of frequencies with said first frequency modulated oscillator signal and for mixing the received signals in said second frequency range with said second frequency modulated oscillator signal.

4. Apparatus according to claim 3 wherein said first mixer means comprises a first mixer for mixing the received signals in said first range of frequencies with said first frequency modulated oscillator signal and a second mixer for mixing the received signals in said second frequency range with said second frequency modulated oscillator signal; and wherein said pilot signal producing means comprises an oscillator for producing a single pilot signal at a predetermined frequency.

5. Apparatus in accordance with claim 3 wherein: said first mixer means comprises a first mixer for mixing the received signals in said first range of frequencies with said first frequency modulated oscillator signal, and a second mixer for mixing the received signals in said second range of frequencies with said second frequency modulated oscillator signal; said first local oscillator means comprises a first oscillator, coupled to the first mixer and a second oscillator coupled to the second mixer; and said pilot signal generating means comprises a first pilot signal oscillator coupled to said first oscillator for producing a pilot signal at a first predetermined frequency and a second pilot signal oscillator coupled to said second oscillator for producing a second pilot signal at a second predetermined frequency.

6. Apparatus in accordance with claim 2 and further comprising second local oscillator means for producing predetermined oscillator signals; second mixer means coupled intermediate said tuned amplifier means and said discriminator means and coupled with said second local oscillator means for mixing the amplified signals with said predetermined oscillator signals; and band-pass filter means coupled intermediate said second mixer means and said discriminator means for passing signals within a predetermined frequency band.

7. Apparatus in accordance with claim 6 and isolating means further comprising sweep generator means coupled to said second local oscillator means for producing a sweep signal at a predetermined repetition rate; whereby said second local oscillator means produces a continuously variable frequency signal over a predetermined range of frequencies at said predetermined repetition rate, comprising said predetermined oscillator signal.

8. Apparatus in accordance with claim 1 wherein said comparator means and said pilot signal producing means are coupled in a phase-locked loop for substantially locking said produced pilot signal with said detected pilot signal.

9. Apparatus in accordance with claim 5 wherein said band pass filter means further comprises a first band-pass filter coupled intermediate said frequency demodulating means and said control means for passing signals over a predetermined frequency band including the predetermined frequency of the first pilot signal; and a second band-pass filter coupled intermediate said detecting means and said control means for passing signals over a predetermined frequency band including the predetermined frequency of said second pilot signal.

10. Apparatus in accordance with claim 9 wherein said phase comparator means further comprises first comparator means coupled to said first band-pass filter and to said first pilot signal oscillator for producing said control output signal when said detected pilot signal is substantially identical in frequency and phase with said first produced pilot signal; and second comparator means coupled intermediate said second band-pass filter and said second pilot signal oscillator for producing a second control output signal when said detected pilot signal is substantially same in frequency and phase with said first produced pilot signal; and wherein said first and second comparator means are coupled respectively with said first and second pilot signal producing means to define first and second phase-locked loops for respectively locking said first and second produced pilot signals with said first and second detected pilot signals.

11. Apparatus in accordance with claim 5 wherein said tuned amplifier means comprises a first tuned amplifier coupled intermediate said first mixer and said detecting means; and a second tuned amplifier coupled intermediate said second mixer and said detecting means.

12. Apparatus for detecting the presence of radar signals occurring within either of a first or a second range of frequencies comprising: antenna means for receiving radar signals including radar signals occurring within said first and second ranges of frequencies; a first local oscillator for producing a first frequency oscillator signal; a second local oscillator for producing a second frequency oscillator signal; means for producing a pilot signal at a predetermined frequency; means for frequency modulating both said first frequency oscillator signal and said second frequency oscillator signal with said pilot signal; a first mixer coupled to said antenna means and to said first local oscillator for mixing the received signals in said first range of frequencies with said modulated first frequency oscillator signal; a second mixer coupled to said antenna means and to said second local oscillator for mixing the received signals in said second range of frequencies with said modulated second frequency oscillator signals; frequency demodulating means coupled to said first and second mixers for detecting said pilot signal; and control means responsive to said detected pilot signal for producing a control output signal; whereby the presence of said control output signal is indicative of the reception of radar signals occurring within at least one of said first and second ranges of frequencies; wherein said control means comprises phase comparator means coupled to receive the detected pilot signal and the initially produced pilot signal for producing said control output signal in response to a detected pilot signal and the produced pilot signal occurring at substantially the same frequency and phase, and wherein said phase comparator means and said pilot signal producing means are coupled together in a phase-locked loop for substantially locking in the produced pilot signal with the detected pilot signal.

13. Apparatus in accordance with claim 12 and further including tuned amplifier means coupled intermediate said frequency demodulating means and both of said first and second mixers for amplifying only the mixed signals therefrom which fall within a predetermined range of frequencies: and wherein said detecting means comprises FM discriminator means coupled in circuit with said tuned amplifier means for demodulating the mixed and amplified signals to detect the pilot signal.

14. Apparatus in accordance with claim 12 and further including band-pass filter means coupled intermediate said frequency demodulating means and said control means for passing signals over a predetermined range of frequencies, said predetermined range including the predetermined frequency of said pilot signal.

15. Apparatus in accordance with claim 13 and further including a further local oscillator for producing a further oscillator signal; and a further mixer coupled intermediate said tuned amplifier means and said discriminator means for mixing said further oscillator signal with said amplified signal.

16. Apparatus according to claim 15 and further including band-pass filter means coupled intermediate said further mixer and said discriminator means for passing substantially only signals within a predetemined range of frequencies from said second mixer means.

17. Apparatus according to claim 15 and further including sweep generator means coupled with said further local oscillator for producing a sweep signal at a predetermined repetition rate, whereby said further oscillator signal comprises a signal continuously sweeping across a predetermined frequency range at said predetermined repetition rate.

18. Apparatus for detecting the presence of radar signals occurring within a predetermined range of frequencies comprising: antenna means for receiving radar signals including radar signals occurring within said predetermined range of frequencies; a first local oscillator for producing a first frequency oscillator signal; means for producing a pilot signal at a predetermined frequency; means for frequency modulating said first frequency oscillator signal with said pilot signal; a first mixer coupled to said antenna means and to said first local oscillator for mixing the received signals with said modulated first frequency oscillator signal; frequency demodulating means coupled to said first mixer for detecting said pilot signal; and control means responsive to said detected pilot signal for producing a control output signal; whereby the presence of said control output signal is indicative of the reception of radar signals occurring within said predetermined ranges of frequencies; wherein said control means comprises comparator means coupled to receive the detected pilot signal and the initially produced pilot signal for producing said control output signal in response to a detected pilot signal and the produced pilot signal occurring at substantially the same frequency and phase, and wherein said comparator means and said pilot signal producing means are coupled together in a phase-locked loop for substantially locking in the produced pilot signal with the detected pilot signal.

* * * * *